United States Patent
Speranza

[19]

[11] Patent Number: 6,105,818
[45] Date of Patent: *Aug. 22, 2000

[54] FOOD DISPENSING CYCLE AND MEANS

[75] Inventor: Angelo Speranza, Surrey, United Kingdom

[73] Assignee: Burlodge Limited, Surrey, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/776,097

[22] PCT Filed: May 8, 1996

[86] PCT No.: PCT/GB96/01097

§ 371 Date: Feb. 19, 1997

§ 102(e) Date: Feb. 19, 1997

[87] PCT Pub. No.: WO96/35362

PCT Pub. Date: Nov. 14, 1996

[30] Foreign Application Priority Data

May 9, 1995 [GB] United Kingdom ............ 9509375

[51] Int. Cl.$^7$ ........................................... A47J 39/00
[52] U.S. Cl. ...................... 221/1; 221/150 R; 312/236; 165/918; 219/386
[58] Field of Search ................... 221/1, 150 R, 221/150 HC; 312/236, 249.8, 249.11; 165/918; 219/385, 386, 387

[56] References Cited

U.S. PATENT DOCUMENTS

| 3,261,650 | 7/1966 | Stromqvist | 312/236 |
|---|---|---|---|
| 3,275,393 | 9/1966 | Stentz et al. | 219/386 |
| 4,005,745 | 2/1977 | Colato et al. | 312/236 |
| 4,103,736 | 8/1978 | Colato et al. | 312/236 |
| 4,156,456 | 5/1979 | Muller | 165/48.1 |
| 4,203,486 | 5/1980 | Rubbright et al. | 165/48.1 |
| 4,254,824 | 3/1981 | Springer | 312/236 |
| 4,285,391 | 8/1981 | Bourner | 312/236 |
| 4,323,110 | 4/1982 | Rubbright et al. | 165/2 |
| 4,397,159 | 8/1983 | Dodd | 312/236 |
| 4,544,024 | 10/1985 | Baggott | 165/48 R |
| 5,069,273 | 12/1991 | O'Hearne | 165/12 |
| 5,086,834 | 2/1992 | Grandi | 165/135 |
| 5,182,438 | 1/1993 | Oakes et al. | 219/386 |
| 5,221,023 | 6/1993 | Dubik | 221/1 |
| 5,285,051 | 2/1994 | DeGrow et al. | 219/386 |
| 5,393,960 | 2/1995 | Beizermann | 165/918 |
| 5,403,997 | 4/1995 | Wimpee et al. | 219/386 |
| 5,404,935 | 4/1995 | Liebermann | 165/48.1 |

*Primary Examiner*—Robert P. Olszewski
*Assistant Examiner*—Thuy V. Tran
*Attorney, Agent, or Firm*—Davis and Bujold

[57] ABSTRACT

A method of dispensing food whereby food prepared at a first location is transported to a second location for dispensing in a working cycle characterized by the steps of: apportioning the food onto a plurality of trays (20A, 20B) at the first location, loading the plurality of trays (20A, 20B) into a rack (15) to give, in combination, a spaced array of loaded trays; the spaced array having predetermined overall dimensions; transporting the spaced array to an intermediate location, placing the loaded rack into a containment (11) with an internal volume (12) of sufficient size to receive at least one spaced array; transporting the containment along with its spaced array or arrays to the second location; regenerating food in the spaced array while within the containment; dispensing loaded trays (20A, 20B) from the spaced array; and returning the racks (15) back to the first or some other location for re-use. Apparatus for dispensing food comprising a containment (11) adapted to receive at least, one removable rack (15), the rack being adapted to contain at least two removable trays (20A, 20B) for food for regeneration.

1 Claim, 2 Drawing Sheets

FOOD DISPENSING CYCLE AND MEANS

TECHNICAL FIELD

This invention relates to a food dispensing cycle and means for undertaking it.

BACKGROUND ART

The dispensing of food in large organisations frequently involves the preparation of food at a first location followed by its being moved and then dispensed at a second location. At the first location the food is prepared and then divided into individual portions on a utensil, such as a plate or bowl, which will be presented to an individual consumer at the second location. Given the prepared utensil is loaded with food at the first location there arise the need to ensure that the food is kept at a storage temperature where deterioration will be minimised or eliminated until a regeneration step is undertaken to ensure that the consumer receives the food on its utensil without having been contaminated in some way, in a good and visually attractive condition and at the correct temperature. To meet this requirement it is commonly the practice to make use of mobile trolleys at the second location into which trays of prepared food from the first location are placed and a regenerative cycle is then undertaken either by way of heating/cooling means in the trolley or to which the trolley can be linked.

GB Patent 1527 119 shows a mobile container having an insulated outer case which is insulated and divided into compartments each containing a set of tray supports in the form of upper and lower flanges each side and at the back. Each tray has locations for holding in the supports and several apertures along the sides. These hold bowls provided with covers for the hot food. Underneath each row of apertures is a heating element on which the bowls sit raised above the tray surface but retained by raised portions on tray and bowls. The compartment is otherwise refrigerated the remainder of the tray area being taken up by cold food. This arrangement requires special trays and heaters and does not readily lend itself to food regeneration processes. It also does not provide readily for a change in the area of the tray subject to heating as distinct from cooling or for maintenance at a temperature approximating to ambient temperature in the region of the trolley.

DISCLOSURE OF INVENTION

According to a first aspect of the present invention there is provided a method of dispensing food whereby wherein food prepared at a first location is transported to a second location for dispensing in a working cycle characterised by 1 apportioning the food onto a plurality of trays at the first location;
2 loading the plurality of trays into a rack to give, in combination, a spaced array of loaded trays the spaced array having predetermined overall dimensions;
3 transporting the spaced array to an intermediate location;
4 placing the spaced array into a containment with an internal volume of sufficient size to receive at least one spaced array;
5 transferring the containment along with its spaced array or arrays to the second location;
6 regenerating food in the spaced array while within the containment;
7 dispensing food from trays in the spaced array;
8 returning the racks back to the first, or some other, location for re-use.

According to a first preferred version of the first aspect of the present invention the step of regenerating food is undertaken by way of heating and/or cooling means located in the containment.

According to a second preferred version of the first aspect of the present invention the step of regenerating food is undertaken by way of heating and/or cooling means demountably coupled to the containment.

According to a third preferred version of the first aspect of the present invention or any preceding preferred version thereof the containment is mobile.

According to a second aspect of the present invention there is provided apparatus for dispensing food comprising a containment adapted to receive at least one removable rack, the rack being adapted to contain at least two removable tray for food for regeneration.

BRIEF DESCRIPTION OF DRAWINGS

An exemplary embodiment of the invention will now be described with reference to the accompanying drawings which show a method of dispensing food and equipment therefore of which.

MODES FOR CARRYING OUT THE INVENTION

Figure 1:
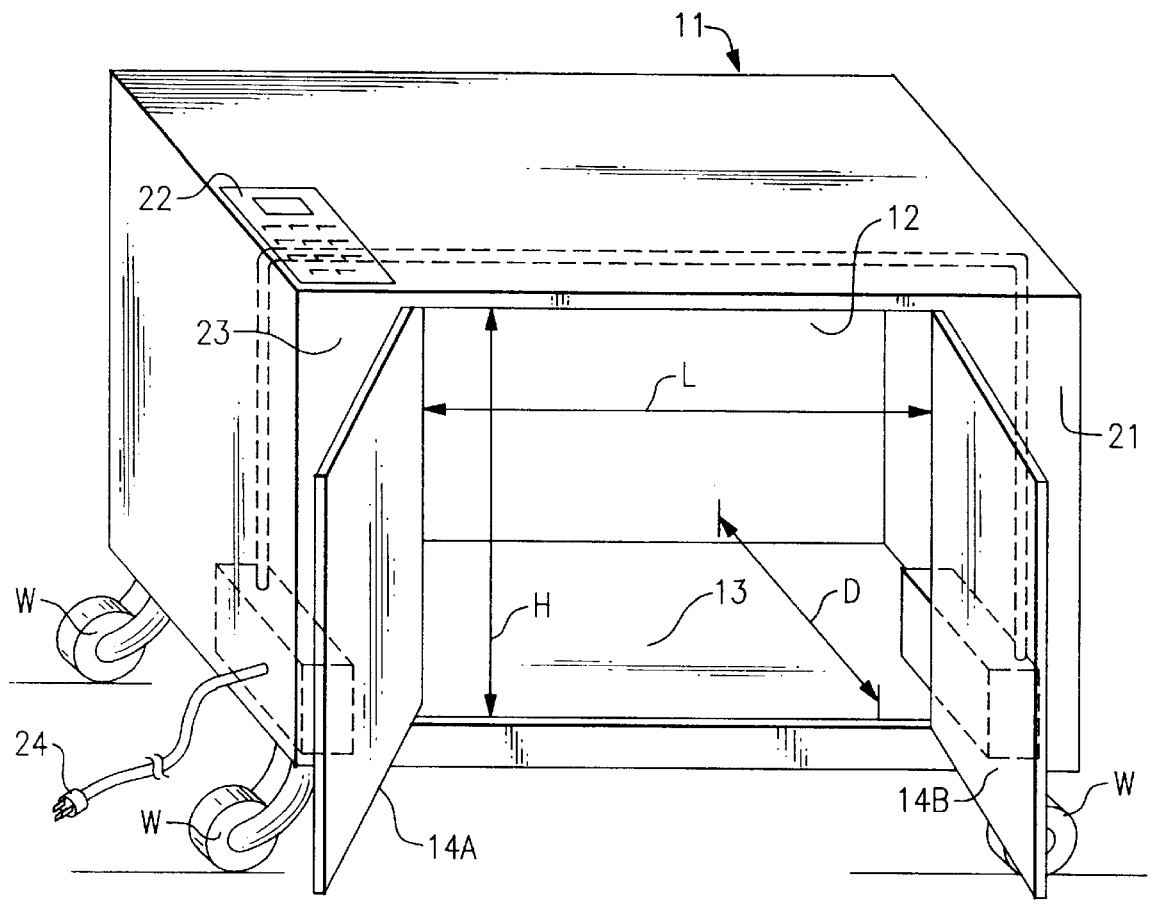
FIG. 1 is a perspective view of a trolley.

FIG. 1 shows a mobile trolley 11 for food regeneration which has an interior volume 12 having dimensions: length L, height H and depth D. The interior volume 12 is accessed through aperture 13 can be closed by doors 14A, 14B. The interior volume 12 is substantially free of an obstructions and is of a size and shape to accommodate two racks described in connection with FIG. 2. The trolley is equipped with castors W to enable it to be readily moved.

Figure 2:
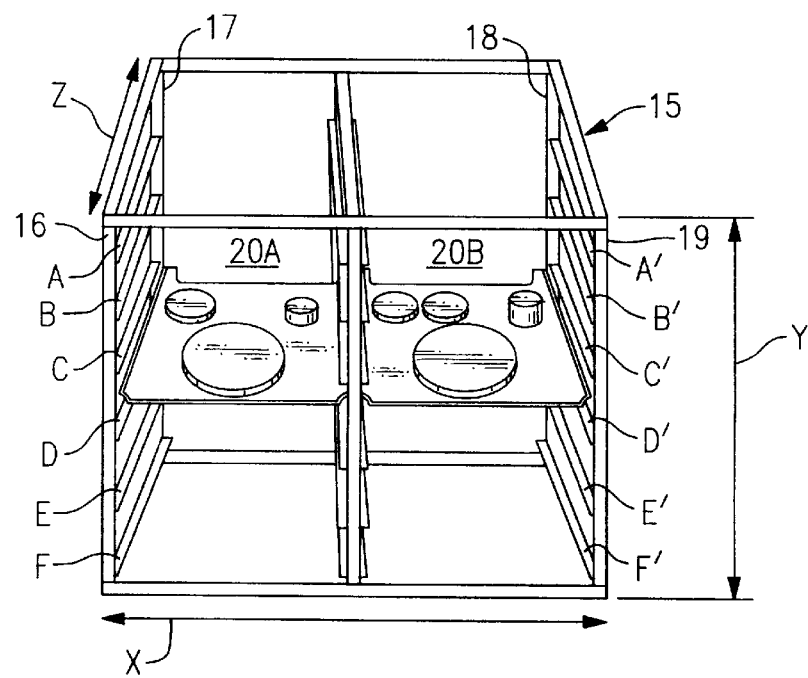
FIG. 2 is a perspective view of a rack and trays for incorporation in the trolley of FIG. 1.

FIG. 2 shows a rack 15 is made up of corner posts 16 to 19 linked by pairs of horizontally opposed rail pairs A, A' to F, F'. Mid posts M1, M2 serve to divide the interior parts of the rack into two vertical halves and to support the inner. Each pair of rails serves to accommodate a pair of trays. Typically rails C, C' support trays 20A, 20B. The rail pairs A, A' to F, F' are spaced so as to provide clearance above each tray enabling each tray to hold food for an eventual consumer. The rack 15 is of sufficient strength and rigidity to support without distortion a full complement of tray pairs each tray being loaded with foodstuff so that the rack and trays (along with their contents) constitute a racked array. The outside dimensions of the array: width X, height Y and depth Z are slightly smaller than the interior dimensions L, H, D of the trolley so that two loaded racks are a snug fit within the interior volume 12 of the trolley 11 so that the rack 15 is prevented from excessive movement relative to the trolley 11.

The trolley 11 has an end section 21 which contains an electrically powered heater and fan to enable air at a predetermined temperature to circulated within the interior volume 12, or a part thereof as defined by baffles within the trolley or located on each tray. This enables food on each tray, or a particular part of each tray, to be warmed in accordance with a predetermined program established by way of a control panel 22. The trolley 11 also has an end section 23 which contains a refrigerating unit and fan to provide for air to be cooled and circulated over a region of each tray where food is to be maintained cool. The trolley 11 can be plugged into a power supply by way of lead 24 to enable the heating and cooling systems to be operated.

Figure 3:
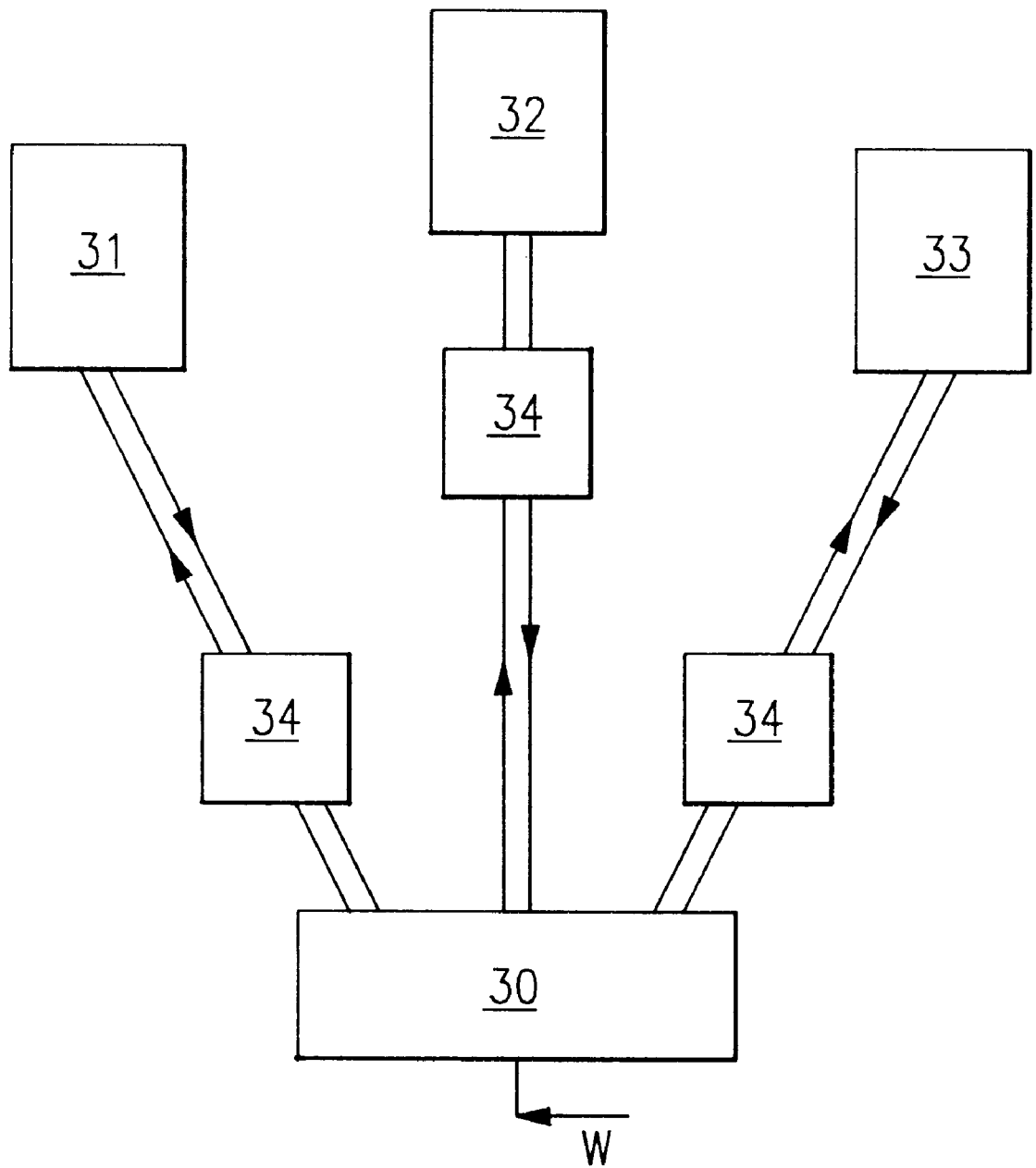
FIG. 3 is a block diagram showing the steps involved in the method.

The method of operation of the food dispensing system will now be considered with particular reference to FIG. 3.

Supply location 30 represents a food preparation area for supplying a number of consumer sites 31, 32, 33 which are in this case hospitals which are some distance from each other and from supply location 30. The supply location receives raw materials and supplies by path W. At the supply location 30 food is prepared, cooled and plated and individual amounts for an individual consumer at one of the consumer sites are placed on a tray. Trays for delivery to a particular consumer location 31 are placed on one or more racks as described in relation to FIG. 1. The racked arrays are then loaded into a refrigerated transfer vehicle whereby the food is transferred to location 31. The vehicle is equipped with a load space incorporating suitable cooling means to ensure that trays of food in each rack does not exceed predetermined limits.

The transfer vehicle then delivers along path S the racked arrays bearing the food to consumer site 31. At an intermediate location at the site each racked array is unloaded from the vehicle and loaded into a regeneration trolleys of the type described in connection with FIG. 1. The loaded trolley is then moved closer to the location of the eventual consumers of the contents of the trolley. The trolley is connected to a power supply and is then powered up to enable the food content of the racked array to be automatically regenerated according to a predetermined program held in the control unit of the trolley. Once regeneration has been completed the trolley is opened and the trays and their contents distributed to the recipients.

Once consumption of the food has been completed the trays are returned to the racks in the trolley. The trolley is then transferred to the intermediate location at the consumer site where the racks loaded with the now used trays are transferred from the trolley into a vehicle which returns the used trays and utensils to the supply location 30 for cleaning and reloading.

If necessary a vehicle can deliver racks bearing food for consumption over a period of time. In such a case given that sufficient regeneration trolleys are available then the trolleys can all be loaded and programmed to ensure that regeneration occurs at appropriate times. Alternatively if sufficient trolleys are not available then the loaded racks can be kept in some form of chilled storage.

Satellite sites 32, 33 are supplied in a similar way to that described for site 31.

It will be apparent that the method of the embodiment enables equipment to be utilised efficiently and to reduce the need for expensive regeneration trolleys to be transported outside the site where they are used. Each site thus retains control of its own regeneration trolleys. The only items needing to be transported between supply site 30 and the consumer sites 31, 32, 33 are the racks bearing the trays and two or three racks are substantially cheaper than a regeneration trolley. A single regeneration trolley can be used for a given location, say a word, to provide meals for, say three, eating periods in a day. The trolley is initially charged with racks bearing loaded trays and a regeneration cycle completed prior to food being distributed for the first meal. This cycle can readily be repeated for two further meal periods since all that is required is the removal of racks with emptied trays, cleaning and recharging with a fresh set of racks with food bearing trays. Cleaning is readily undertaken since the interior of a trolley utilising the racks of the present invention contain little apart from the wall, and top and bottom surfaces.

A supply site 30, possibly many miles from one or more consumer sites, can be equipped, staffed and operated to take advantage of economies of scale and so supply consumer sites more efficiently than would be possible where each consumer site has its own food preparation and distribution system. In addition the transportation of more racks than regeneration trolleys can beundertaken in a given vehicle. At the supply site the cleaning and storage of racks and the loading of racks with charged trays involves smaller storage and handling areas at the supply site than would be possible where charged trays have to be loaded into regeneration trolleys recovered from the or each consumer site.

What is claimed is:

1. A method of preparing, transporting and dispensing food between a series of remote locations, the method comprising the steps of:

preparing the food for consumption at the first location;

apportioning the food onto a plurality of trays at the first location;

stacking the trays in a manually maneuverable rack, and providing the rack with a predetermined stacking arrangement of particular dimensions;

loading the maneuverable rack onto a refrigerated vehicle for transportation to a second remote location;

transferring the maneuverable rack, at the second location, into a moveable receptacle comprising at least one of heating and cooling means, and the receptacle being configured to receive at least one of the plurality of racks;

relocating the moveable receptacle to a desired position;

activating at least one of the heating and cooling means prior to dispensing of the food trays to consumers;

dispensing the food trays to the consumers for consumption;

collecting and re-stacking the trays in the rack situated within the receptacle;

removing the at least one maneuverable rack form the moveable receptacle for transportation of the rack back to the first location.

\* \* \* \* \*